US011292294B1

(12) United States Patent
Long et al.

(10) Patent No.: US 11,292,294 B1
(45) Date of Patent: Apr. 5, 2022

(54) ZERO-TURN-RADIUS RIDING MOWER CASTER WHEEL STABILIZER

(71) Applicant: Bad Boy Mowers, LLC, Batesville, AR (US)

(72) Inventors: Warren Long, Batesville, AR (US); Joe Jackson, Batesville, AR (US)

(73) Assignee: Bad Boy Mowers, LLC, Batesville, AR (US)

( * ) Notice: Subject to any disclaimer, the term of this patent is extended or adjusted under 35 U.S.C. 154(b) by 0 days.

(21) Appl. No.: 17/087,352

(22) Filed: Nov. 2, 2020

Related U.S. Application Data (60) Provisional application No. 63/107,883, filed on Oct. 30, 2020.

(51) Int. Cl.
*B60B 33/00* (2006.01)

(52) U.S. Cl.
CPC ..... *B60B 33/0068* (2013.01); *B60Y 2200/223* (2013.01)

(58) Field of Classification Search
CPC ..... Y10T 16/182; Y10T 16/19; Y10T 16/202; Y10T 16/204; Y10T 16/205; Y10T 16/196; Y10T 16/186; Y10T 16/01; Y10T 16/203; B60B 33/00; B60B 33/002; B60B 33/007; B60B 33/005; B60B 33/006; B60B 33/0039; B60B 33/0049; B60B 33/0057; B60B 33/0068; B60B 2200/22; A61G 5/1907; A61G 5/10; A61G 5/02; A61G 5/041; B62B 2301/04; B62B 2301/0465; B60Y 2200/223

See application file for complete search history.

(56) References Cited

U.S. PATENT DOCUMENTS

| | | | | |
|---|---|---|---|---|
| 1,919,666 A | * | 7/1933 | Patterson | B60B 33/0002 16/38 |
| 1,922,099 A | * | 8/1933 | Kilian | B60B 33/0002 16/38 |
| 2,155,827 A | * | 4/1939 | Herold | B60B 33/0002 16/38 |
| 4,969,232 A | * | 11/1990 | Michel | B60B 33/0002 16/350 |

(Continued)

FOREIGN PATENT DOCUMENTS

| | | | | |
|---|---|---|---|---|
| DE | 10106688 A1 | * | 9/2002 | ......... B60B 33/0002 |
| JP | 2000177305 A | * | 6/2000 | ......... B60B 33/0002 |
| JP | 2008006190 A | * | 1/2008 | |

OTHER PUBLICATIONS

Bad Boy Mowers; 2019 "Compact Outlaw Zero-Turn Mower Owner's, Service & Parts Manual"; pp. 1-56.

(Continued)

*Primary Examiner* — Chuck Y Mah
(74) *Attorney, Agent, or Firm* — Bracewell LLP; Christopher L. Drymalla (57) ABSTRACT

A mower front caster wheel system that includes a caster wheel assembly that rotates about a caster axis, and a stabilizer to be disposed in a bearing housing coupled to a frame of a mower such that a first portion of the stabilizer is in contact with a component that rotates with the caster wheel assembly and a second portion of the stabilizer is in contact with an internal surface of the bearing housing, to provide resistance to rotation of the caster wheel assembly relative to the bearing housing.

26 Claims, 4 Drawing Sheets

(56) References Cited

U.S. PATENT DOCUMENTS

| | | | | |
|---|---|---|---|---|
| 5,167,048 | A * | 12/1992 | Geiger | B60B 33/0028 16/19 |
| 6,944,910 | B2 * | 9/2005 | Pauls | B60B 33/0002 16/35 D |
| 10,092,465 | B2 * | 10/2018 | Van de Wal | B60B 33/0007 |
| 10,252,571 | B2 * | 4/2019 | Jordan | B60B 33/0039 |
| 2017/0172822 | A1 * | 6/2017 | Golden, Jr. | A61G 5/027 |

OTHER PUBLICATIONS

Bad Boy Mowers; 2019 "Maverick Models Zero-Turn Mower Owner's, Service & Parts Manual"; pp. 1-68.

Bad Boy Mowers; 2019 "MZ Magnum Models Zero-Turn Mower Owner's, Service & Parts Manual"; pp. 1-60.

Bad Boy Mowers; 2019 "MZ Models Zero-Turn Mower Owner's, Service & Parts Manual"; pp. 1-60.

Bad Boy Mowers; 2019 "Rebel Outlaw Zero-Turn Mower Owner's, Service & Parts Manual"; pp. 1-72.

Bad Boy Mowers; 2019 "Renegade Diesel Outlaw Zero-Turn Mower Owner's, Service & Parts Manual"; pp. 1-56.

Bad Boy Mowers; 2019 "Renegade Gas Outlaw Zer-Turn Mower Owner's, Service & Parts Manual"; pp. 1-56.

Bad Boy Mowers; 2019 "Revolt Stand on Zero-Turn Mower Owner's, Service & Parts Manual"; pp. 1-52.

Bad Boy Mowers; 2019 "Rogue Outlaw Zero-Turn Mower Owner's, Service & Parts Manual"; pp. 1-60.

Bad Boy Mowers; 2019 "ZT Elite Models Zero-Turn Mower Owner's, Service & Parts Manual"; pp. 1-60.

Bad Boy Mowers; 2020 "1500cc Diesel Zero-Turn Mower Owner's Operator Service and Parts Manual"; pp. 1-56.

Bad Boy Mowers; 2020 "Compact Outlaw Zero-Turn Mower Owner's Operator Service and Parts Manual"; pp. 1-52.

Bad Boy Mowers; 2020 "Maverick Models Zero-Turn Mower Owner's Operator Service and Parts Manual"; pp. 1-60.

Bad Boy Mowers; 2020 "MZ Models Zero-Turn Mower Owner's Opertor Service and Parts Manual"; pp. 1-56.

Bad Boy Mowers; 2020 "Rebel Outlaw Zero-Turn Mower Owner's Operator Service and Parts Manual"; pp. 1-60.

Bad Boy Mowers; 2020 "Renegade Diesel Outlaw Zero-Turn Mower Owner's Operator Service and Parts Manual"; pp. 1-52.

Bad Boy Mowers; 2020 "Renegade Gas Outlaw Zero-Turn Mower Owner's Operator Service and Parts Manual"; pp. 1-56.

Bad Boy Mowers; 2020 "Revolt Stand on Zero-Turn Mower Owner's Operator Service and Parts Manual"; pp. 1-60.

Bad Boy Mowers; 2020 "Rogue Outlaw Zero-Turn Mower Owner's Operator Service and Parts Manual"; pp. 1-60.

Bad Boy Mowers; 2020 "ZT Avenger Models Zero-Turn Mower Owner's Operator Service and Parts Manual"; pp. 1-52.

Bad Boy Mowers; 2020 "ZT Elite Models Zero-Turn Mower Owner's Operator Service and Parts Manual" pp. 1-56.

* cited by examiner

INSTALL STABILIZING MEMBER TO PROVIDE RESISTANCE TO SWIVELING OF CASTER WHEEL ASSEMBLY RELATIVE TO BEARING HOUSING COUPLED TO FRAME OF MOWER
702

FIG. 7

ZERO-TURN-RADIUS RIDING MOWER CASTER WHEEL STABILIZER

FIELD

Embodiments relate generally to mowing devices and more particularly to riding mower wheel stabilizing systems.

BACKGROUND

A lawn mower (or "mower") is a device that is used to cut (or "mow") grassy areas. A mower typically utilizes one or more rotating blades that cut grass as the mower travels across the ground. A mower often takes the form of a walk-behind mower or a riding mower (or "ride-on" mower). A walk-behind mower is typically operated by an operator that walks behind and guides the mower. Some walk-behind mowers require the operator to push the mower across the ground (often referred to as "push" mowers). Some walk-behind mowers have a propulsion system that assists in propelling the mower (often referred to as "self-propelled" walk-behind mowers). A riding mower is typically operated by an operator that rides on the mower as it travels across the ground. A riding mower normally includes an operator support, such as a seat or platform, and a drive system that propels the mower.

A zero-turn-radius (ZTR) riding mower is a type of riding mower. A ZTR riding mower typically includes right and left control handles (or "control arms" or "drive arms" or "control levers" or "steering levers") that an operator can push and pull to cause forward or backward rotation of right and left drive wheels, independent of one another. This can enable the mower to make sharp turns with ease, even swiveling the entire mower in place—hence the label "zero-turn-radius." A ZTR riding mower is often desirable for its agility, speed, and wide mowing coverage. A ZTR mower typically employs drive units, such as hydrostatic (or "hydraulic") transaxles, that selectively rotate drive wheels forward or backward in response manipulation of the control handles. A ZTR mower normally employs front caster wheels that support the front end of the mower. The caster wheels are generally free to swivel, which enables the front end of the mower to turn freely in response to selective driving of the rear wheels. ZTR mowers often take the form of sit-on ZTR mowers or stand-on ZTR mowers. A sit-on ZTR mower typically includes a seat and is designed to be operated with the operator seated in the seat. A stand-on ZTR mower typically includes a platform and is designed to be operated with the operator standing on the platform.

SUMMARY

Caster wheels of riding mowers are susceptible to "caster flutter," sometimes referred to as "caster wobble." This is attributable to a phenomenon in which a caster wheel is harmonically excited, which causes the caster wheel to oscillate from side to side as the wheel rolls forward. This flutter can become quite severe, forcing the operator to slow from the desired speed. For example, the caster style front wheels of a zero-turn-radius (ZTR) riding mower may swivel (or "flutter" or "wobble") back and forth about its vertical caster axis as the mower traverses the ground. The timing and extent of the flutter can be dependent on a number of factors, such as rolling speed, design of the caster wheel (e.g., the rake and trail of the caster wheel fork), alignment of the wheel, play between the caster wheel spindle and bearings, resistance to rolling of the wheel, resistance to swiveling of the caster wheel assembly, weight supported by the caster wheel assembly, irregularities of the terrain being traversed by the mower, manufacturing defects, and so forth. Caster flutter has become more prevalent as the ground speed of mowers has increased. The numerous factors can make it difficult to predict if and when caster flutter will occur, and how to address it.

In some instance, manufactures place excessive pre-load on the caster bearings in an effort to generate resistance to the swiveling of the caster wheel assembly. Unfortunately, this can stress the bearings and be detrimental to the performance and life of the bearings. In some instances, manufactures employ relative high viscosity bearing grease in an effort to increase resistance to the swiveling of the caster wheel assembly. Unfortunately, a high viscosity grease may provide only minimal improvement, if any, over low viscosity grease, and the increased thickness of the grease can allow the rolling elements of the bearing to carve a path in the grease, resulting in the higher viscosity grease providing less resistance to swiveling than a relatively low viscosity grease.

Provided are embodiments of a mower caster wheel stabilizing system. In some embodiments, a stabilizing element (or "stabilizer") is disposed in a bearing housing of a caster wheel system to provide resistance to rotation (or "swiveling") of the caster wheel assembly about a vertically oriented caster axis, which can, in turn, reduce the occurrence of caster flutter of the caster wheel assembly. For example, a cylindrically shaped stabilizer sleeve may be disposed (e.g., squeezed) between a bearing housing (e.g., a hollow cylinder coupled to a frame of the mower and that houses the bearings) and a bearing spacer (e.g., a hollow cylinder that maintains vertical spacing between upper and lower bearings and that rotates with the caster wheel) such that it contacts both of the bearing housing and the bearing spacer. The contact may, in turn, create friction that resists rotation of the bearing spacer (and other components of the caster wheel assembly) relative to the bearing retainer. For example, if a torque is applied to a caster yoke assembly to promote swiveling of the caster wheel assembly about the caster axis, the contact (or "interference") between the bearing housing and the bearing spacer provided by the stabilizer sleeve may provide a frictional force that generates a reaction toque that at least partially counter the applied torque. This can, in turn, provide a resistance to the swiveling of the caster yoke assembly that mitigates the occurrence of caster flutter. In some embodiments, the stabilizing sleeve is an elastomeric cylinder (e.g., a rubber cylindrical sleeve) that is fit about an exterior surface of the bearing spacer and is of sufficient radial thickness to contact an internal surface of the bearing housing.

Provided in some embodiments is a ZTR riding mower front caster wheel system, that includes the following: a bearing housing comprising a hollow cylindrical member having a housing internal surface; and a front caster wheel assembly comprising: a caster wheel assembly comprising: a front caster yoke comprising: a caster fork; and a caster spindle comprising an elongated stem extending from the caster fork and disposed in the bearing housing; and a front wheel assembly coupled to the caster fork, the front wheel assembly comprising a wheel adapted to rotate about a horizontally oriented axle axis, and the front wheel assembly adapted to rotate about a vertically oriented caster axis; an upper caster bearing disposed in the bearing housing and about an upper portion of the elongated stem of the caster spindle disposed in the bearing housing, the upper caster bearing comprising a spindle bearing adapted to facilitate rotation of the caster wheel assembly about the vertically oriented caster axis; a lower caster bearing disposed in the bearing housing and about a lower portion of the elongated stem of the caster spindle disposed in the bearing housing, the lower caster bearing comprising a spindle bearing adapted to facilitate rotation of the caster wheel assembly about the vertically oriented caster axis; a bearing spacer comprising a hollow cylindrical member disposed between the upper caster bearing and the lower caster bearing and adapted to maintain a vertical spacing between the upper spindle bearing and the lower spindle bearing, the bearing spacer disposed in the bearing housing and about a mid-portion of the elongated stem of the caster spindle disposed in the bearing housing, the hollow cylindrical member of the bearing spacer having a bearing spacer external surface, the housing internal surface and the bearing spacer external surface defining an annular region there between; a stabilizer comprising a hollow cylindrical member having a stabilizer internal surface and a stabilizer external surface, the stabilizer disposed about the bearing spacer and in the bearing housing such that the stabilizer internal surface is in contact with the bearing spacer external surface and the stabilizer external surface is in contact with the housing internal surface to provide friction that is adapted to resist rotation of the caster wheel assembly relative to the bearing housing; and a retainer coupled to an upper portion of the elongated stem of the caster spindle and adapted to retain the upper spindle bearing, the bearing spacer and the lower spindle bearing in position relative to the caster spindle and the bearing housing.

In some embodiments, the stabilizer is formed of an elastomer. In some embodiments, the elastomer includes Styrene Butadiene Rubber (SBR). In some embodiments, the stabilizer includes a cylindrical rubber sleeve. In some embodiments, the stabilizer is disposed about a mid-portion of the bearing spacer. In some embodiments, the system further includes: a cover coupled to an upper end of the bearing housing; and a cylindrical spacer disposed about the caster stem and between an upper portion of the caster fork and the lower spindle bearing. In some embodiments, the bearing housing includes a vertically oriented cylinder coupled to a front end of a frame of a ZTR riding mower.

Provided in some embodiments is a mower front caster wheel system that includes the following: a caster wheel assembly comprising: a front caster yoke comprising: a caster fork; and a caster spindle extending from the caster fork and adapted to be disposed in a bearing housing coupled to a frame of a mower, the caster fork adapted to couple to a front wheel assembly comprising a wheel adapted to rotate about a horizontally oriented axle axis, and the caster wheel assembly adapted to rotate about a vertically oriented caster axis; and a stabilizer adapted to be disposed in the bearing housing such that a first portion of the stabilizer is in contact with a component adapted to rotate about the vertically oriented caster axis with the caster wheel assembly, and a second portion of the stabilizer is in contact with an internal surface of the bearing housing to provide resistance to rotation of the caster wheel assembly relative to the bearing housing.

In some embodiments, the stabilizer is formed of an elastomer. In some embodiments, the elastomer includes SBR. In some embodiments, the stabilizer includes a hollow cylindrical member. In some embodiments, the stabilizer includes a cylindrical rubber sleeve. In some embodiments, the system further includes: an upper caster bearing adapted to be disposed in the bearing housing and about an upper portion of the caster spindle disposed in the bearing housing; a lower caster bearing adapted to disposed in the bearing housing and about a lower portion of the caster spindle disposed in the bearing housing; and a bearing spacer adapted to be disposed between the upper caster bearing and the lower caster bearing and to be disposed about a mid-portion of the caster spindle disposed in the bearing housing, and the bearing spacer adapted to rotate about the vertically oriented caster axis with the caster wheel assembly, the stabilizer adapted to be disposed in the bearing housing such that the first portion of the stabilizer is in contact with the bearing spacer, and the second portion of the stabilizer is in contact with an internal surface of the bearing housing to provide resistance to rotation of the caster wheel assembly relative to the bearing housing. In some embodiments, the upper caster bearing includes a spindle bearing adapted to facilitate rotation of the caster wheel assembly about the vertically oriented caster axis, and the lower caster bearing includes a spindle bearing adapted to facilitate rotation of the caster wheel assembly about the vertically oriented caster axis. In some embodiments, the system further includes a retainer coupled to an upper portion of the caster spindle and adapted to retain the upper spindle bearing, the bearing spacer and the lower spindle bearing in position relative to the caster spindle and the bearing housing. In some embodiments, the system further includes: a cover coupled to an upper end of the bearing housing; and a cylindrical spacer disposed about the caster spindle and between an upper portion of the caster fork and the lower spindle bearing. In some embodiments, the bearing housing includes a vertically oriented cylinder coupled to a front end of a frame of a ZTR riding mower.

Provided in some embodiments is a method of assembling a mower front caster wheel system, the method comprising: disposing a stabilizer in a bearing housing coupled to a frame of a mower such that a first portion of the stabilizer is in contact with a component adapted to rotate about a vertically oriented caster axis with a caster wheel assembly, and a second portion of the stabilizer is in contact with an internal surface of the bearing housing to provide resistance to rotation of the caster wheel assembly about the vertically oriented caster axis relative to the bearing housing, the caster wheel assembly comprising: a front caster yoke comprising: a caster fork adapted to couple to a front wheel assembly comprising a wheel adapted to rotate about a horizontally oriented axle axis; and a caster spindle extending from the caster fork and adapted to be disposed in the bearing housing coupled to a frame of a mower.

In some embodiments, the stabilizer includes an elastomer, and the elastomer of the stabilizer is compressed to fit between the internal surface of the bearing housing and the component adapted to rotate about the vertically oriented caster axis with the caster wheel assembly. In some embodiments, the mower is a ZTR riding mower.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Provided are embodiments of a mower caster wheel stabilizing system. In some embodiments, a stabilizing element (or "stabilizer") is disposed in a bearing housing of a caster wheel system to provide resistance to rotation (or "swiveling") of the caster wheel assembly about a vertically oriented caster axis, which can, in turn, reduce the occurrence of caster flutter of the caster wheel assembly. For example, a cylindrically shaped stabilizer sleeve may be disposed (e.g., squeezed) between a bearing housing (e.g., a hollow cylinder coupled to a frame of the mower and that houses the bearings) and a bearing spacer (e.g., a hollow cylinder that maintains vertical spacing between upper and lower bearings and that rotates with the caster wheel) such that it contacts both of the bearing housing and the bearing spacer. The contact may, in turn, create friction that resists rotation of the bearing spacer (and other components of the caster wheel assembly) relative to the bearing retainer. For example, if a torque is applied to a caster yoke assembly to promote swiveling of the caster wheel assembly about the caster axis, the contact (or "interference") between the bearing housing and the bearing spacer provided by the stabilizer sleeve may provide a frictional force that generates a reaction toque that at least partially counter the applied torque. This can, in turn, provide a resistance to the swiveling of the caster yoke assembly that mitigates the occurrence of caster flutter. In some embodiments, the stabilizing sleeve is an elastomeric cylinder (e.g., a rubber cylindrical sleeve) that is fit about an exterior surface of the bearing spacer and is of sufficient radial thickness to contact an internal surface of the bearing housing.

Figure 1:
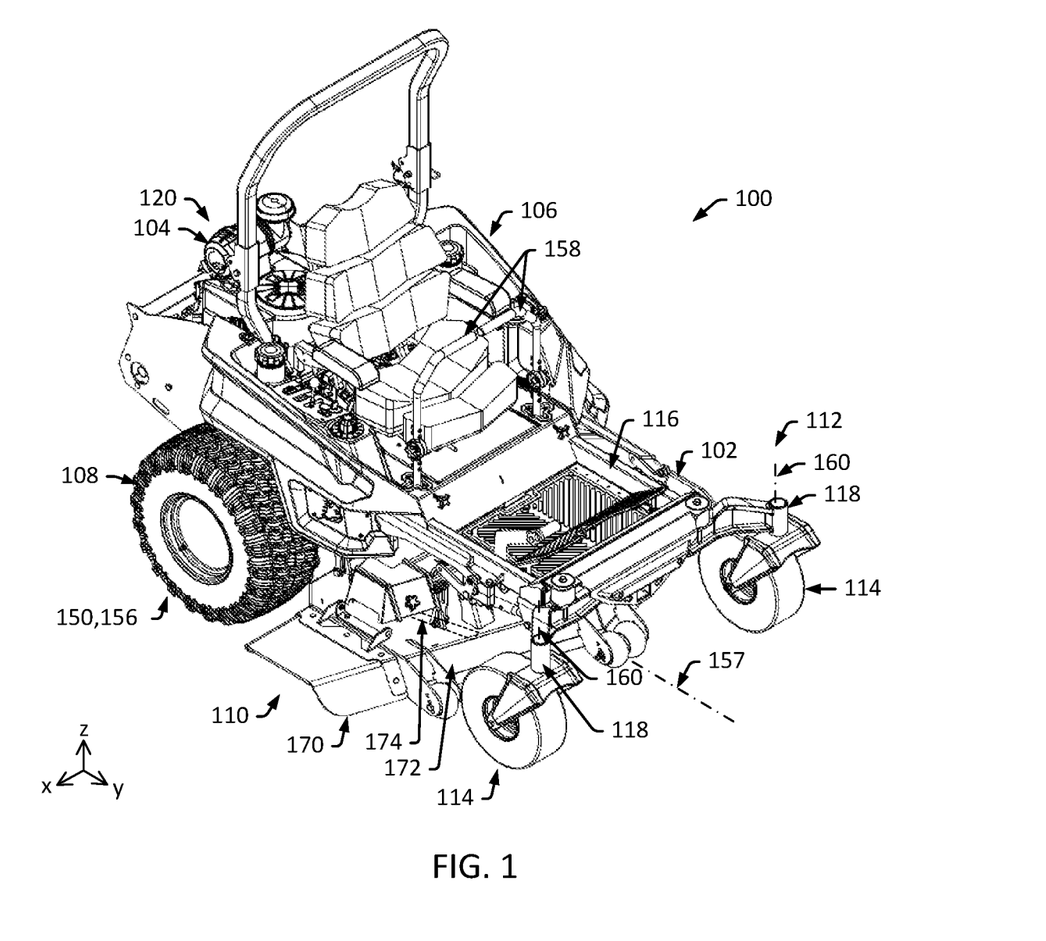
FIG. 1 is a diagram that illustrates a mower system in accordance with one or more embodiments.

FIG. 1 is a diagram that illustrate a sit-on ZTR riding mower (or "mower") 100 in accordance with one or more embodiments. In the illustrated embodiment, the mower 100 includes a frame system (or "frame") 102, a power system 104, a control system 106, a drive system 108, and a cutting system 110, with the drive system 108 including a mower front caster wheel system 112 that includes right and left front caster wheel assemblies 114.

In some embodiments, the frame 102 is a rigid structure that supports components of the mower 100. For example, the frame 102 may include a rigid structure formed of metal members that are rigidly fastened to one another such that they do not move relative to one another. In some embodiments, the frame 102 includes a frame weldment 116. The frame weldment 116 may include a rigid metal structure formed of multiple members that are welded, or similarly fastened, together. Other components of the mower 100 may be coupled to the frame 102 to, for example, position them relative to the frame 102 and other components of the mower 100. For example, the frame 102 may include right and left caster receivers 118 positioned on right and left forward portions of the frame 102 and that are employed to secure respective ones of the right and left front caster wheel assemblies 114 for supporting the front end of the frame 102.

In some embodiments, the power system 104 includes a motor 120. The motor 120 may supply motive power used to operate the mower 100. In some embodiments, the motor 120 includes an engine, such as an internal combustion engine (e.g., a gas-fueled engine, a diesel-fueled engine, or a natural gas-fueled engine) or an electric motor. In some embodiments, the motor 120 is coupled to the frame 102. For example, the motor 120 may be bolted, or otherwise secured, to the frame weldment 116. In some embodiments, the power supplied by the motor 120 rotates (or "drives") a drive shaft of the motor 120, which can, in turn, be used as motive power for other components of the mower 100. For example, rotation of the drive shaft may drive circulation of drive belts that transmit motive power from the drive shaft to the drive system 108 and the cutting system 110.

In some embodiments, one or more drive pulleys are coupled to the drive shaft of the motor 120. The drive pulleys may include, for example, a pump drive pulley and a deck drive pulley. In some embodiments, the drive pulleys engage with respective drive belts that are employed to transmit motive power to other components of the mower 100. For example, the pump drive pulley may engage with a pump drive belt (or "pump belt") that is circulated to transmit motive power to hydraulic pumps of the drive system 108. The deck drive pulley may engage with a deck drive belt (or "deck belt") that is circulated to transmit motive power to spindles and cutting blades of the cutting system 110. During operation of the mower 100, the motor 120 may be operated to rotate the drive shaft, the pump drive pulley and the deck drive pulley, which, in turn, drives circulation of the pump drive belt and the deck drive belt.

In some embodiments, the control system 106 includes controls for regulating operation of the mower 100. For example, the control system 106 may include an ignition switch (e.g., a switch operable to start or stop operation of the motor 120), a throttle control (e.g., a lever operable to regulate the operational speed of the motor 120), a blade control (e.g., a knob operable to engage or disengage the cutting system 110), a wheel brake control (e.g., a lever operable to engage or disengage a wheel brake), a deck height control (e.g., a lever to adjust a height of a cutting deck and blades), or a user interface (e.g., a display of status information for the mower 100, such as motor hours). An operator may interact with the control system 106 to, for example, control and monitor various aspects of the operation of the mower 100.

For reference, the right and left sides of the mower 100 may be defined relative to the direction an operator is expected to be primarily facing while operating the mower 100. "Forward" may refer to the direction that an operator is expected to be primarily facing while operating the mower 100. In accordance with the coordinate system axes illustrated, "right" may refer to the positive "x" direction, "left" may refer to the negative "x" direction, "front" (or "forward") may refer to the positive "y" direction, "back" (or "rearward" or "backward") may refer to the negative "y" direction, "up" (or "upward") may refer to the positive "z" direction, and "down" (or "downward") may refer to the negative "z" direction. A longitudinal axis 157 of the mower 100 may be oriented in the "y" direction, for example, passing through or near a midpoint between rear wheels 156 of the mower 100 and extending forward and backward. Unless otherwise specified, "lateral" (or "sideways") movement of components may refer to the components moving left or right (e.g., moving in a direction parallel to the x-axis), "longitudinal" movement of components may refer to the components moving forward or backwards (e.g., moving in a direction parallel to the y-axis), and "vertical" movement of components may refer to the components moving upwards or downwards (e.g., moving in a direction parallel to the z-axis). Vertical rotation of components may refer to the components rotating about a vertically oriented axis (e.g., rotating about an axis oriented parallel to the z-axis). Horizontal rotation of components may refer to the components rotating about a horizontally oriented axis (e.g., rotating about an axis oriented parallel to the plane containing the x-axis and the y-axis).

In some embodiments, the drive system (or "propulsion system") 108 includes components for driving (or "propelling") the mower 100. In some embodiments, the drive system 108 includes wheel assemblies (or "wheels") 150 and one or more drive units that transmit power for propelling the mower 100. For example, the drive system 108 may include the right and left front caster wheel assemblies 114 (or "front wheel assemblies" or "front wheels"), right and left rear wheel assemblies (or "back wheel assemblies" or "back wheels") 156, and right and left drive units operable to drive rotation of the right and left rear wheels 156, respectively, to propel the mower 100 across the ground. Each of the wheel assemblies 150 may include, for example, a respective tire assembly that includes a tire coupled a rim (or "wheel").

As illustrated, the front wheels 114 may be positioned at or near a front end of the frame system 102. For example, the front wheels 114 may include a right front wheel 114 positioned at a right-front of the mower 100 (e.g., to provide support for a right-front portion of the mower 100) and a left front wheel 114 positioned at a left-front of the mower 100 (e.g., to provide support for a left-front portion of the mower 100). During operation of the mower 100, power intended to propel the mower 100 may not be directly transmitted to the front wheels 114. Rotation of the front wheels 114 may, for example, be indirectly driven by rotation (or "rolling") of the rear wheels 156 across the ground. Accordingly, the front wheels 114 may be referred to as "non-drive" wheels. As illustrated, each of the front wheels 114 may be a caster style wheel that can swivel about a respective caster axis 160 in response to corresponding movements of the mower 100.

The rear wheels 156 may be positioned at or near a rear end of the frame system 102. For example, the rear wheels 156 may include a right rear wheel positioned at a right-rear of the mower 100 (e.g., to provide structural support for a right-rear portion of the mower 100) and a left rear wheel (not visible) positioned at a left-rear of the mower 100 (e.g., to provide structural support for a left-rear portion of the mower 100). During operation of the mower 100, power intended to propel the mower 100 may be directly transmitted to the rear wheels 156 (e.g., power intended to propel the mower 100 may be transmitted from the motor 120 to the rear wheels 156 by way of a respective drive units coupled to the wheels 156). Accordingly, the rear wheels 156 may be referred to as "drive" wheels. In some embodiments, drive units drive rotation of the rear wheels 156 to propel the mower 100. Each of the right and left rear wheels 156 may be coupled to a drive axle of right and left drive units, respectively. Each of the drive units may include, for example, a hydrostatic (or "hydraulic") transaxle that is selectively operable to rotate its drive axle (and its associated rear wheel 156) forward or backward about a horizontally oriented rotational axis (e.g., a rotational axis oriented in the x-direction). An operator may, for example, push/pull right or left control levers 158 (coupled to the drive units), or similar controls (e.g., a joystick), to selectively and simultaneously operate the respective drive units to drive rotation of the rear wheels 156 forward or backward.

In some embodiments, the cutting system 110 includes components that provide for cutting (or "mowing") of grass. The cutting system 110 may include, for example, a mowing deck system (or "deck system") 170 that includes a mowing deck (or "deck") 172 that houses one or more cutting blades (or "blades") 174. During operation of the mower 100, the blades 174 may be driven into rotation to cut (or "mow") grass under the deck 172 as the mower 100 traverses the ground. The deck 172 may include, for example, a rigid housing (e.g., a metal housing) that shields the operator and components of the mower 100 from debris, such as flying grass, dust or rocks generated by the rotating blades 174. In some embodiments, the cutting system 110 includes multiple blades 174. For example, the deck system 170 may include left, center and right blades 174.

Figure 2:
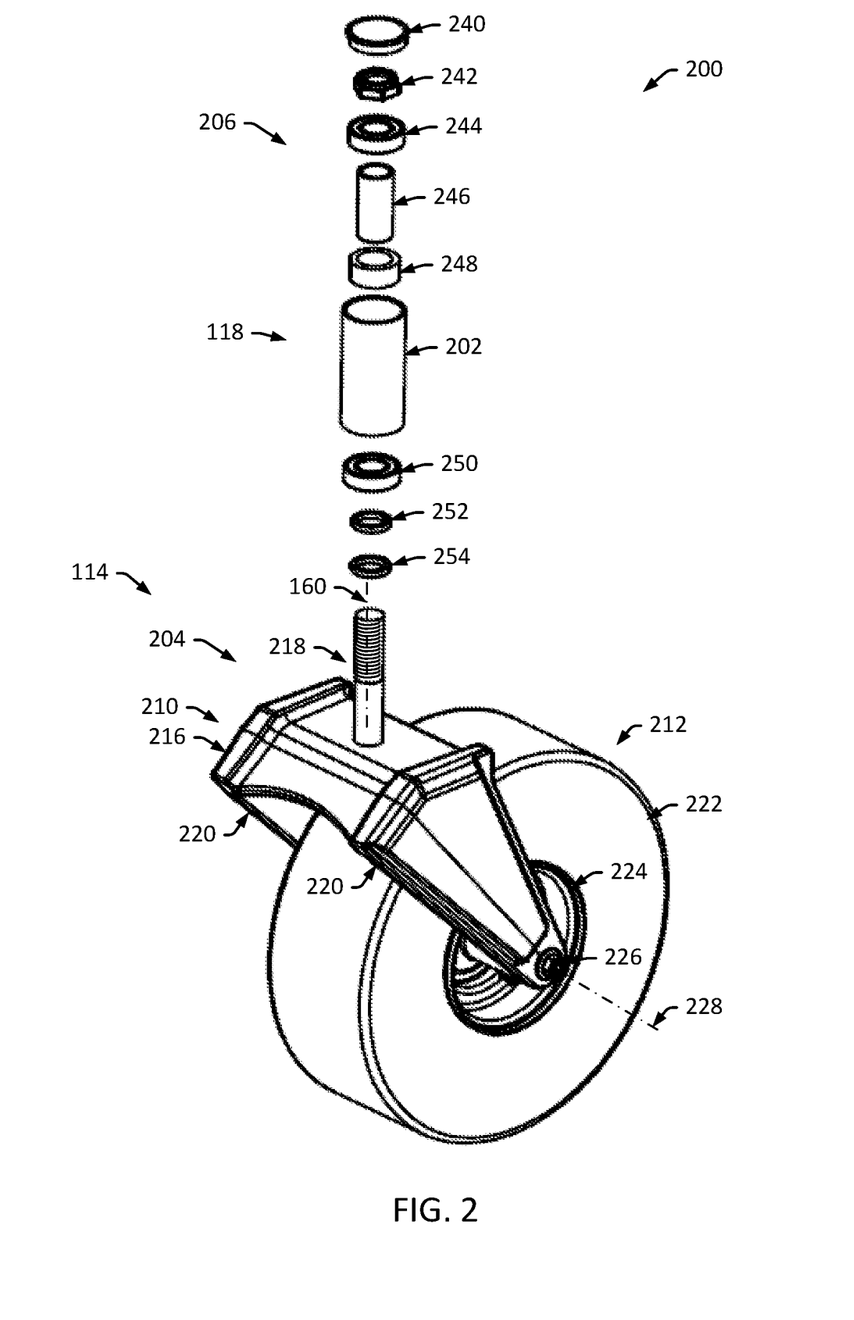
FIG. 2 is a diagram that illustrates an exploded view of a caster wheel system in accordance with one or more embodiments.
Figure 3:
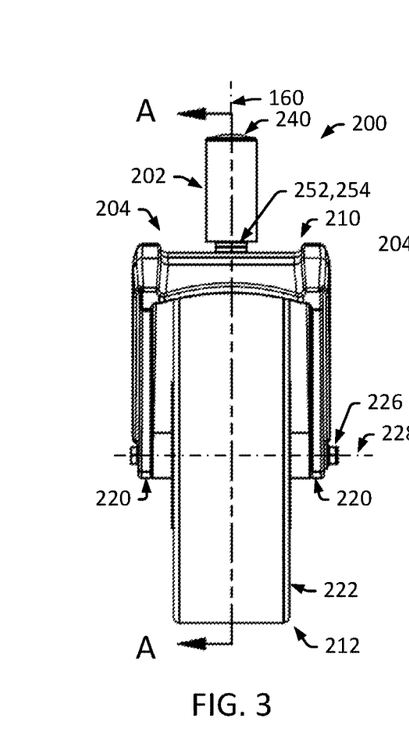
FIG. 3 is a diagram that illustrates a front view of the mower caster wheel system in accordance with one or more embodiments.
Figure 4:
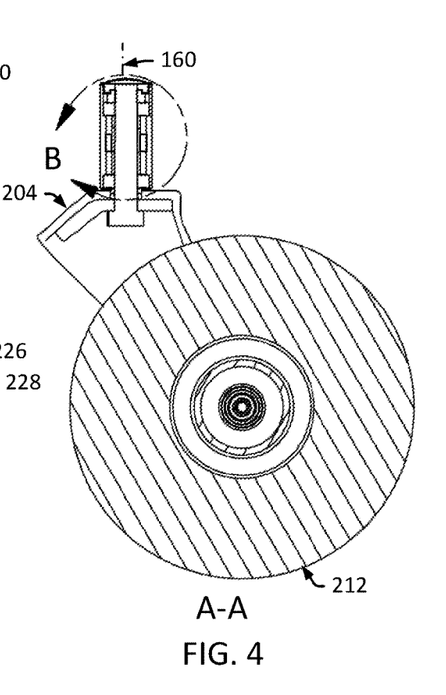
FIG. 4 is a diagram that illustrates a sectioned view (across section line A-A of FIG. 3) of the mower caster wheel system in accordance with one or more embodiments.
Figure 5:
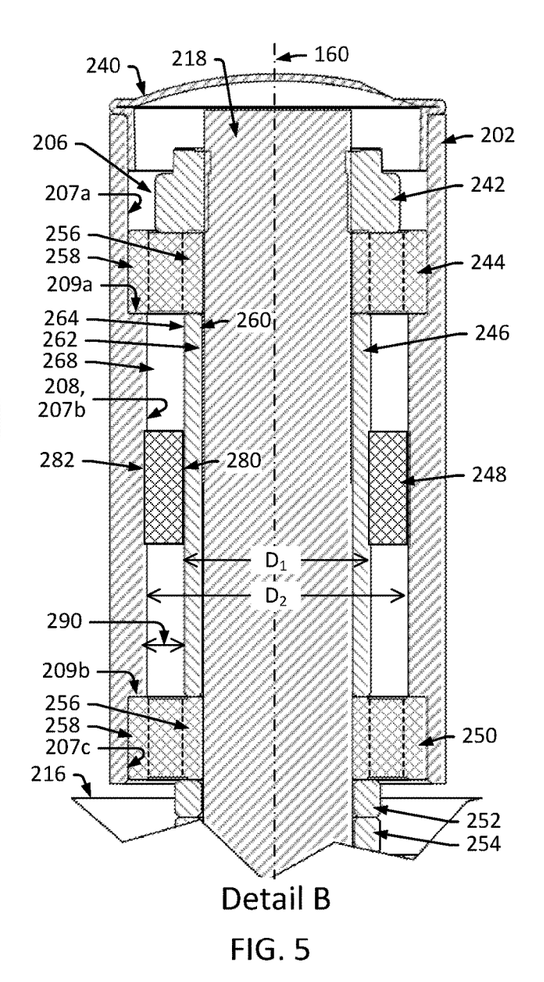
FIG. 5 is a diagram that illustrates a detailed view (detail B of FIG. 4) of the mower caster wheel system in accordance with one or more embodiments.

FIGS. 2-5 illustrate detailed views of a front caster wheel system 200 in accordance with one or more embodiments. FIG. 2 is a diagram that illustrates an exploded view of the caster wheel system 200 in accordance with one or more embodiments. FIG. 3 is a diagram that illustrates a front view of the mower caster wheel system 200 in accordance with one or more embodiments. FIG. 4 is a diagram that illustrates a sectioned view (across section line A-A of FIG. 3) of the mower caster wheel system 200 in accordance with one or more embodiments. FIG. 5 is a diagram that illustrates a detailed view (detail B of FIG. 4) of the mower caster wheel system 200 in accordance with one or more embodiments.

In the illustrated embodiment, the front caster wheel system 200 includes a front caster wheel assembly 114 and a caster receiver 118. The caster receiver 118 may be, for example, the right or left caster receiver 118 of FIG. 1, and the front caster wheel assembly 114 may be the respective right or left front caster wheel assembly 114 of FIG. 1.

In the illustrated embodiment, the caster receiver 118 is defined by a bearing housing 202 formed of a hollow, elongated, generally cylindrical shaped member. In some embodiments, the bearing housing 202 is coupled to a mower frame. For example, an exterior of the bearing housing 202 may be fastened (e.g., welded or bolted) to the right or left front portion of the frame weldment 116. Referring to FIG. 5, an upper portion 207a of the internal surface 208 of the bearing housing 202 has a relatively large internal diameter (e.g., a diameter that is about the same as the outer diameter of the upper caster bearing 244). A middle portion 207b of the internal surface 208 of the bearing housing 202 has a relatively small internal diameter (e.g., a diameter that is less than the outer diameter of the upper and lower caster bearings 244 and 250). A lower portion 207c of the internal surface 208 of the bearing housing 202 has a relatively large internal diameter (e.g., a diameter that is about the same as the outer diameter of the lower caster bearing 250). The variations in diameter of the internal surface 208 of the bearing housing 202 defines upper and lower steps 209a and 209b against which the upper and lower caster bearings 244 and 250 are seated. The length of the middle portion 207b of the internal surface 208 of the bearing housing 202 may have a length that is the same or greater than the bearing spacer 246 described here.

Referring to FIG. 2, in the illustrated embodiment, the front caster wheel assembly 114 includes a caster wheel assembly 204 that is rotatably coupled to the bearing housing 202 by way of a caster bearing system 206. The caster wheel assembly 204 includes a front caster yoke 210 and a wheel assembly 212.

In the illustrated embodiment, the front caster yoke 210 includes a caster fork 216 and a caster spindle 218. The caster fork 216 is a U-shaped component having right and left tines 220 for supporting the wheel assembly 212. The caster spindle 218 is defined by an elongated cylinder (or "stem") that extends upward from a top of the caster fork 216. The upper end of the caster spindle 218 is threaded (e.g., for receipt of a complementary threaded bearing retainer 242, as describe herein). The caster spindle 218 is rotatably coupled to the bearing housing 202 by way of the caster bearing system 206 as described here. During use, the caster wheel assembly 204 may rotate (or "swivel" or "spin") about the caster axis 160. The caster axis 160 may be, for example, an axis that is coincident with a longitudinal axis of the caster spindle 218 or the caster bearings (e.g., caster bearings 244 and 250) of the caster bearing system 206. The caster axis 160 may be vertically oriented, for example, having an orientation that is within about 15 degrees of vertical (e.g., within 15 degrees of the z-axis).

In the illustrated embodiment, the wheel assembly 212 includes a tire (e.g., a rubber tire) 222 mounted to a wheel (e.g., a metal rim) 224. The wheel assembly 212 is rotatably coupled to the caster fork 216 by way of a wheel axle 226 (e.g., a bolt and spanner) that passes through a center of the wheel 224 and that spans the right and left tines 220 of the caster fork 216. During use, the wheel assembly 212 may rotate (or "roll") about a wheel axis 228 that is coincident with a longitudinal axis of the wheel axle 226. The wheel axis 228 may be horizontally oriented, for example, having an orientation that is within about 15 degrees of horizontal (e.g., within 15 degrees of the x-y plane).

In the illustrated embodiment, the bearing system 206 includes a bearing cover 240, a bearing retainer 242, an upper caster bearing 244, a bearing spacer 246, a stabilizer 248, a lower caster bearing 250, an upper spacer 252 and a lower spacer 254.

The bearing cover 240 may be secured to an upper end of the bearing housing 202 to shield the interior of the bearing housing 202 and components disposed therein, such as the bearing system 206 and caster spindle 218, from environmental contaminants, such as dust and water. For example, in the illustrated embodiment, the bearing cover 240 is a disc shaped dust cap (or "grease cap") that covers the upper end of the bearing housing 202.

The bearing retainer 242 may be secured to the upper end of the caster spindle 218 to position and retain components of the bearing system 206 within the bearing housing 202. The spacers 252 and 254 may be disposed about a lower portion of the caster spindle 218, between the upper portion of the front caster yoke 210 and a lower surface of the lower caster bearing 250, to provide desired spacing between the components of the bearing system 206 and the bearing housing 202, and the front caster yoke 210 and the wheel assembly 212. For example, in the illustrated embodiment, the bearing retainer 242 is a nut that is threaded onto the threaded upper end of the caster spindle 218 and abuts the upper surface of the upper caster bearing 244. The spacers 252 and 254 are cylindrical spacers (e.g., washers) that are disposed about a lower portion of the caster spindle 218 and between an upper portion of the caster fork 216 and the lower caster bearing 250. The bearing retainer 242 may be threaded on to the upper end of the caster spindle 218 to draw the caster spindle 218, the front caster yoke 210 and the spacers 252 and 254 upward (e.g., to seat the upper caster bearing 244 against the upper step 209a of the bearing housing 202, and seat the lower caster bearing 250 against the lower step 209b of the bearing housing 202, and to retain the upper caster bearing 244, the bearing spacer 246, and the lower caster bearing 250 in respective positions relative to the caster spindle 218 and the bearing housing 202).

The upper and lower caster bearings 244 and 250 may facilitate guided rotation of the caster spindle 218 and bearing spacer 246 (and the caster wheel assembly 204) relative to the bearing housing 202 (and other components of the mower 100). In some embodiments, each of the upper caster bearing 244 and the lower caster bearing 250 is a spindle bearing having an inner race 256 that is disposed about an external surface of the caster spindle 218 and an outer race 258 that is disposed against an internal surface of the bearing housing 202 (see, e.g., FIG. 5). The interior faces of the inner races 256 may contact the external surface of the caster spindle 218 such that the inner races 256 rotate with the caster spindle 218. The lower and upper faces of the inner races 256 of the upper and lower caster bearings 244 and 250 may contact the top and bottom of the bearing spacer 246 such that the inner races 256 rotate with the bearing spacer 246. The exterior faces of the outer races 258 may contact the internal surface 208 of the bearing housing 202 such that the outer races 258 do not move relative to the bearing housing 202. During use, the inner races 256 may contact and rotate with the caster spindle 218, the bearing spacer 246, and the outer races 258 may contact and remain stationary with the bearing housing 202 to facilitate rotation of the caster spindle 218 (and the caster wheel assembly 204) relative to the bearing housing 202 (and other components of the mower 100).

The bearing spacer 246 may provide support for and maintain the positons of the inner races 256 of the upper and lower caster bearings 244 and 250. In some embodiments, the bearing spacer 246 may be a rigid (e.g., a metal) hollow cylinder disposed about a mid-portion of the caster spindle 218, between the lower and upper faces of the inner races 256 of the upper and lower caster bearings 244 and 250. The internal surface 260 of the bearing spacer 246 may be adjacent to the external surface 262 of the caster spindle 218. In some embodiments, the internal surface 260 of the bearing spacer 246 contacts the external surface 262 of the caster spindle 218 and the contact there between generates a frictional interference that promotes rotation of the bearing spacer 246 with the caster spindle 218. The external surface 264 of the bearing spacer 246 and the internal surface 207b of the mid portion of the bearing housing 202 may define an annular region 268 there between. During use, the bearing spacer 246 may support (and maintain a vertical spacing between) the inner races 256 of the upper and lower caster bearings 244 and 250. Further, as described, the bearing spacer 246 may contact and rotate with the inner races 256 (and the caster wheel assembly 204) relative to the outer races 258 and the bearing housing 202 (and other components of the mower 100).

The stabilizer 248 may be an element disposed between stationary components of the front caster wheel system 114 and one or more components that rotate about the caster axis 160 with the caster wheel assembly 204 to provide an interference between the components that that resists rotation of the one or more components (and the caster wheel assembly 204) about the caster axis 160, relative to the bearing housing 202. For example, the stabilizer 248 may be an element disposed in the annular region 268 that is squeezed between the bearing housing 202 and the bearing spacer 246, to provide an interference that resists rotation of the bearing spacer 246 (and the caster wheel assembly 204) about the caster axis 160, relative to the bearing housing 202. The resistance provided by the interference may be in form of a counter acting torque generated by frictional forces between the stabilizer 248 and one or both of internal surface 207b of the midsection of the bearing housing 202 and the external surface 264 of the bearing spacer 246.

In some embodiments, the stabilizer 248 is an elastomeric hollow cylindrical member that is disposed in the annular region 268. For example, the stabilizer 248 may be a rubber cylindrical sleeve having an internal surface 280 and an external surface 282. The stabilizer 248 may be disposed about the bearing spacer 246 and within the bearing housing 202 such that the stabilizer internal surface 280 is in contact with the bearing spacer external surface 264, and the stabilizer external surface 282 is in contact with the housing internal surface 207b. When a torque is introduced to promote rotation of the caster wheel assembly 204 relative to the bearing housing 202 (e.g., as a result of the tire 222 impacting an object), friction provided by the contact of the stabilizer 248 with the bearing spacer external surface 264 and the housing internal surface 207b may generate a counteracting torque that resist rotation of the caster wheel assembly 204 relative to the bearing housing 202, and to promote an interference fit between the bearing spacer 246 and the bearing housing 202.

In some embodiments, the stabilizer 248 is formed of an elastomeric material. For example, the stabilizer 248 may be formed of a Styrene Butadiene Rubber (SBR)—65 Durometer rubber. The use of an elastomeric material may facilitate compression and deformation of the stabilizer 248 to fit (e.g., squeeze) the stabilizer 248 between the bearing spacer 246 and within the bearing housing 202. For example, where the stabilizer 248 is a rubber cylindrical sleeve, it may be slid over the exterior surface of the bearing spacer 246, and be squeezed between the exterior surface of the bearing spacer 246 and the interior surface of the bearing housing 202.

In some embodiment, the stabilizer 248 has a radial thickness (T) (see, e.g., FIG. 6) that is greater than the distance between the bearing spacer external surface 264 the housing internal surface 207b such that the stabilizer 248, when installed, spans the annular gap 290 between the bearing spacer external surface 264 and the housing internal surface 207b. This excess thickness may cause a compression of the stabilizer 248 between the bearing spacer external surface 264 and the housing internal surface 207b, which, in turn, can generate a friction that provides a counteracting torque to resist rotation of the caster wheel assembly 204 relative to the bearing housing 202. For example, in an embodiment in which the stabilizer 248 is a rubber cylindrical sleeve, the rubber sleeve may be compressed (or "squeezed") between the bearing spacer external surface 264 and the housing internal surface 207b, causing the stabilizer 248 to deform and exert outward forces acting on the bearing spacer external surface 264 and the housing internal surface 207b, which provides interference between the external surface 282 of the stabilizer 248 and the housing internal surface 207b and provides interference between the internal surface 280 of the stabilizer 248 and the bearing spacer external surface 264.

In some embodiments, the interference between the stabilizer external surface 282 and the housing internal surface 207b may be greater or less than the interference between the stabilizer internal surface 280 and the bearing spacer external surface 264. This may create a relatively high and low frictions at each of the interfaces, that may, in turn, allow the stabilizer 248 to remain stationary with respect to the bearing housing 202 or the bearing spacer 246, while moving relative to the other. For example, the interference may be relatively high at the interface between the stabilizer internal surface 280 and the bearing spacer external surface 264, and relatively low at the interface between the stabilizer external surface 282 and the housing internal surface 207b, such that a relatively high friction is provided at the interface between the stabilizer internal surface 280 and the bearing spacer external surface 264, and a relatively low friction is provided at the stabilizer external surface 282 and the housing internal surface 207b. As a result, when a torque is introduced to promote rotation of the caster wheel assembly 204 relative to the bearing housing 202, the stabilizer 248 may rotate with the bearing spacer 246 (and the caster wheel assembly 204), while the stabilizer 248 slides/rotates relative to the bearing housing 202. That is, the stabilizer 248 may remain "fixed" to the bearing spacer 246 while rotating relative to the bearing housing 202. In an alternative embodiment, such as where the interference is relatively high at the interface between the stabilizer external surface 282 and the housing internal surface 207b, the stabilizer 248 may remain "fixed" to the bearing housing 202 while the bearing spacer 246 (and the caster wheel assembly 204) rotate relative to the stabilizer 248. In some embodiments, the material or dimensions of the stabilizer 248 can be varied (e.g., in accordance with rubber standard dimension tolerances) to provide desired interferences and frictional forces between components. This may enable embodiments of the caster wheel assembly to be employed with wheels having varying propensities for wobble.

Figure 6:
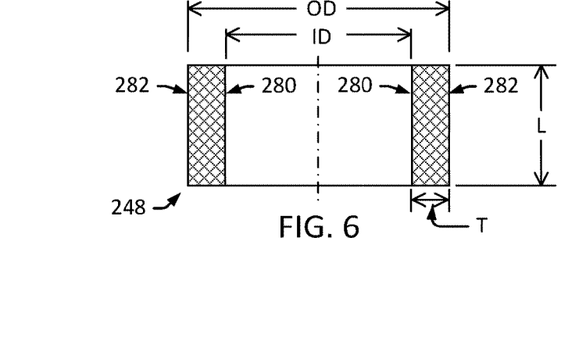
FIG. 6 is a diagram that illustrates the stabilizing sleeve in accordance with one or more embodiments.

Referring to FIG. 6, in some embodiments, the stabilizer 248 has an un-deformed internal diameter (ID) that is about the same or less than the external diameter ($D_1$) of the bearing spacer 246. In such an embodiment, the stabilizer internal surface 280 may be compressed against the bearing spacer external surface 264 when the stabilizer 248 is fit (e.g., stretched) about the bearing spacer 246. In some embodiments, the stabilizer 248 has an un-deformed outer diameter (OD) that is about the same or greater than the internal diameter ($D_2$) of the bearing housing 202 such that stabilizer external surface 282 is compressed against the housing internal surface 207b when the stabilizer 248 is fit (e.g., squeezed) within the bearing housing 202.

In some embodiments, the un-deformed internal diameter (ID) of the stabilizer 248 is about the same, less than or slightly larger than the external diameter ($D_1$) of the bearing spacer 246 (e.g., the un-deformed internal diameter (ID) of the stabilizer 248 is within about 1% of, about 90-99% of, or about 101-110% of the external diameter ($D_1$) of the bearing spacer 246), and the un-deformed external diameter (OD) of the stabilizer 248 is about the same, less than or slightly larger than the internal diameter ($D_2$) of the bearing housing 202 (e.g., the un-deformed external diameter (OD) of the stabilizer 248 is within about 1% of, about 90-99% of, or about 101-110% of the internal diameter ($D_2$) of the bearing housing 202).

For example, the un-deformed internal diameter (ID) may be less than the external diameter ($D_1$) of the bearing spacer 246, and the un-deformed external diameter (OD) of the stabilizer 248 may be less than the internal diameter ($D_2$) of the bearing housing 202. In such an embodiment, the stabilizer 248 may be deformed (e.g., stretched) to fit over the bearing spacer 246 and, as a result, the deformed stabilizer 248 may have a deformed external diameter that is greater than the internal diameter ($D_2$) of the bearing housing 202. In such an embodiment, the deformed stabilizer 248 may be further deformed (e.g., compressed) to fit within the bearing housing 202.

In another example, the un-deformed internal diameter (ID) may be less than the external diameter ($D_1$) of the bearing spacer 246 and the un-deformed external diameter (OD) of the stabilizer 248 may be greater than the internal diameter ($D_2$) of the bearing housing 202. In such an embodiment, the stabilizer 248 may be deformed (e.g., stretched) to fit over the bearing spacer 246 and, as a result, the deformed stabilizer 248 may have a deformed external diameter that is greater than the internal diameter ($D_2$) of the bearing housing 202. In such an embodiment, the deformed stabilizer 248 may be further deformed (e.g., compressed) to fit within the bearing housing 202.

In another example, the un-deformed internal diameter (ID) may be greater than the external diameter ($D_1$) of the bearing spacer 246 and the un-deformed external diameter (OD) of the stabilizer 248 may be greater than the internal diameter ($D_2$) of the bearing housing 202. In such an embodiment, the stabilizer 248 may be deformed (e.g., compressed) to fit within the bearing housing 202 and, as result, the deformed stabilizer 248 may have a deformed internal diameter that is less than the external diameter ($D_1$) of the bearing spacer 246. In such an embodiment, the stabilizer 248 may be further deformed (e.g., stretched/compressed) to fit over the bearing spacer 246.

In some embodiments, the un-deformed internal diameter (ID) of the stabilizer 248 is about 90-98% of the external diameter ($D_1$) of the bearing spacer 246 (e.g., the un-deformed internal diameter (ID) may be the range of about 1.10-1.25 inches (27.9-31.8 millimeters)).

In some embodiments, the un-deformed external diameter (OD) of the stabilizer 248 is about 90%-110% of the internal diameter ($D_2$) of the bearing housing 202 (e.g., the un-deformed external diameter (OD) may be in the range of about 1.45-1.75 inches (36.8-44.5 millimeters)).

In some embodiments, the external diameter ($D_1$) of the bearing spacer 246 is about 101%-110% of the external diameter of the caster spindle 218 (e.g., $D_1$ may be in the range of about 1.05-1.25 inches (26.7-31.8 millimeters)).

In some embodiments, the internal diameter ($D_2$) of the bearing housing 202 is in the range of about 1.50-1.65 inches (38.1-41.9 millimeters) (e.g., $D_2$ may be about 1.55 inches (39.4 millimeters)).

In some embodiments, the longitudinal length (L) of the stabilizer 248 is in the range of about 1.0-1.2 inches (about 25.4-30.5 millimeters) (e.g., L may be about 1.1 inches (27.9 millimeters)).

Figure 7:
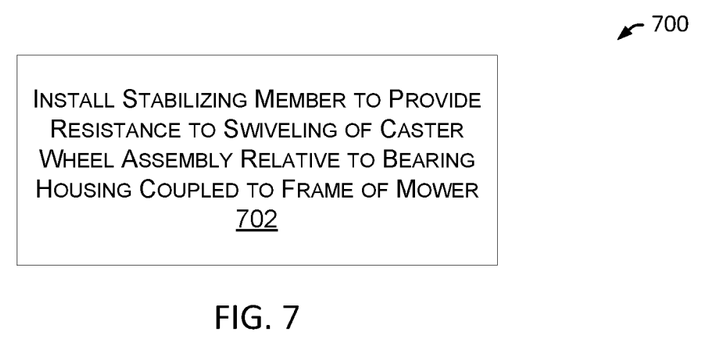
FIG. 7 is a flowchart diagram that illustrates a method of assembling a mower front caster wheel system in accordance with one or more embodiments.

FIG. 7 is a flowchart diagram that illustrates a method 700 of assembling a mower front caster wheel system in accordance with one or more embodiments. In some embodiments, the method 700 includes installing a stabilizing member to provide resistance to vertical rotation (or swiveling") of a caster wheel assembly relative to a bearing housing coupled to the frame of a mower system (block 702). This may include, for example, disposing the stabilizer 248 about the bearing spacer 246 and within the bearing housing 202 the such that the stabilizer internal surface 280 is in contact with the bearing spacer external surface 264 and the stabilizer external surface 282 is in contact with the housing internal surface 207b. For example, installing a stabilizing member to provide resistance to vertical rotation of a caster wheel assembly relative to a bearing housing coupled to the frame of a mower system may include some or all of the following: (1) disposing the spacers 252 and 254 and the lower caster bearing 250 about a lower portion of the caster spindle 218 (e.g., sliding the spacers 252 and 254 and the lower caster bearing 250 over the upper portion of the caster spindle 218 and into a positon at or near a lower portion of the caster spindle 218); (2) disposing the bearing spacer 246 about a mid-portion of the caster spindle 218 (e.g., sliding the bearing spacer 246 over the upper end of the caster spindle 218 and down to the mid-portion of the caster spindle 218); (3) disposing the stabilizer 248 about a mid-portion of the bearing spacer 246 (e.g., sliding the stabilizer 248 over the upper end of the bearing spacer 246 and down to the mid-portion of the bearing spacer 246, such that the stabilizer internal surface 280 is in contact with the bearing spacer external surface 264 of the mid-portion of the bearing spacer 246); (4) disposing the caster spindle 218 into the bearing housing 202 (e.g., inserting the upper end of the caster spindle 218 into the lower end of the bearing housing 202, and advancing the caster spindle 218 upward to move the lower bearing into positon at or near the lower step 209b; (5) disposing the upper caster bearing 244 about the upper portion of the caster spindle 218 (e.g., sliding the upper caster bearing 244 over the upper portion of the caster spindle 218 and into positon at or near the upper step 209a); and (6) installing the bearing retainer 242 about the caster spindle 218 (e.g., threading the retainer 242 onto the threaded upper end of the caster spindle 218, and into engagement with the upper caster bearing 244 to retain the components of the bearing system 206 in positon, including seating of the upper and lower caster bearing 244 and 250 at the steps 209a and 209b, and positioning of the stabilizer 248 in the annular region 268).

What is claimed is:

1. A zero-turn radius (ZTR) riding mower front caster wheel system, comprising:
   a bearing housing comprising a hollow cylindrical member having a housing internal surface; and
   a front caster wheel assembly comprising:
      a caster wheel assembly comprising:
         a front caster yoke comprising:
            a caster fork; and
            a caster spindle comprising an elongated stem extending from the caster fork and disposed in the bearing housing; and
         a front wheel assembly coupled to the caster fork, the front wheel assembly comprising a wheel configured to rotate about a horizontally oriented axle axis, and
         the front wheel assembly configured to rotate about a vertically oriented caster axis;
      an upper caster bearing disposed in the bearing housing and about an upper portion of the elongated stem of the caster spindle disposed in the bearing housing, the upper caster bearing comprising a spindle bearing configured to facilitate rotation of the caster wheel assembly about the vertically oriented caster axis;
      a lower caster bearing disposed in the bearing housing and about a lower portion of the elongated stem of the caster spindle disposed in the bearing housing, the lower caster bearing comprising a spindle bearing configured to facilitate rotation of the caster wheel assembly about the vertically oriented caster axis;
      a bearing spacer comprising a hollow cylindrical member disposed between the upper caster bearing and the lower caster bearing and configured to maintain a vertical spacing between the upper spindle bearing and the lower spindle bearing, the bearing spacer disposed in the bearing housing and about a mid-portion of the elongated stem of the caster spindle disposed in the bearing housing, the hollow cylindrical member of the bearing spacer having a bearing spacer external surface, the housing internal surface and the bearing spacer external surface defining an annular region there between;

a stabilizer comprising a hollow cylindrical member having a stabilizer internal surface and a stabilizer external surface, the stabilizer disposed about the bearing spacer and in the bearing housing such that the stabilizer internal surface is in contact with the bearing spacer external surface and the stabilizer external surface is in contact with the housing internal surface to provide friction that is configured to resist rotation of the caster wheel assembly relative to the bearing housing, the hollow cylindrical member having an un-deformed external diameter that is greater than an internal diameter of the bearing housing and the hollow cylindrical member having un-deformed internal diameter sized such that:
- (a) when the stabilizer is deformed to fit within the bearing housing, the stabilizer is deformed such that the internal surface of the stabilizer has a resulting deformed internal diameter that is less than the external diameter of the bearing spacer, and
- (b) when the stabilizer is deformed to fit within the bearing housing and around the bearing spacer:
  - (i) the external surface of the hollow cylindrical member is compressed against the internal surface of the bearing housing to provide frictional contact between the internal surface of the bearing housing and the external surface of the hollow cylindrical member, and
  - (ii) the internal surface of the hollow cylindrical member is compressed against the external surface of the bearing spacer to provide frictional contact between the external surface of the bearing spacer and the internal surface of the hollow cylindrical member; and a retainer coupled to an upper portion of the elongated stem of the caster spindle and configured to retain the upper spindle bearing, the bearing spacer and the lower spindle bearing in position relative to the caster spindle and the bearing housing.

2. The system of claim 1, wherein the stabilizer is formed of an elastomer.

3. The system of claim 2, wherein the elastomer comprises Styrene Butadiene Rubber (SBR).

4. The system of claim 2, wherein the stabilizer comprises a cylindrical rubber sleeve.

5. The system of claim 1, wherein the stabilizer is disposed about a mid-portion of the bearing spacer.

6. The system of claim 1, further comprising:
a cover coupled to an upper end of the bearing housing; and
a cylindrical spacer disposed about the caster stem and between an upper portion of the caster fork and the lower spindle bearing.

7. The system of claim 1, wherein the bearing housing comprises a vertically oriented cylinder coupled to a front end of a frame of a ZTR riding mower.

8. The system of claim 1, wherein the un-deformed internal diameter of the hollow cylindrical member is 90-110% of the external diameter of the bearing spacer.

9. The system of claim 1, wherein the un-deformed internal diameter of the hollow cylindrical member is greater than the external diameter of the bearing spacer.

10. A mower front caster wheel system comprising:
a caster wheel assembly comprising:
a front caster yoke comprising:
a caster fork; and
a caster spindle extending from the caster fork and configured to be disposed in a bearing housing coupled to a frame of a mower,
the caster fork configured to couple to a front wheel assembly comprising a wheel configured to rotate about a horizontally oriented axle axis, and
the caster wheel assembly configured to rotate about a vertically oriented caster axis; and
a stabilizer configured to be disposed in the bearing housing such that a first portion of the stabilizer is in contact with a component configured to rotate about the vertically oriented caster axis with the caster wheel assembly, and a second portion of the stabilizer is in contact with an internal surface of the bearing housing to provide resistance to rotation of the caster wheel assembly relative to the bearing housing,
the stabilizer comprising a hollow cylindrical member having (a) an un-deformed external diameter that is greater than an internal diameter of the internal surface bearing housing and (b) an un-deformed internal diameter that is sized such that, when the stabilizer is deformed to fit within the bearing housing, the internal surface of the stabilizer has a resulting deformed internal diameter that is less than the external diameter of the component configured to rotate about the vertically oriented caster axis.

11. The system of claim 10, wherein the stabilizer is formed of an elastomer.

12. The system of claim 11, wherein the elastomer comprises Styrene Butadiene Rubber (SBR).

13. The system of claim 10, wherein the stabilizer comprises a cylindrical rubber sleeve.

14. The system of claim 10, further comprising:
an upper caster bearing configured to be disposed in the bearing housing and about an upper portion of the caster spindle disposed in the bearing housing; and
a lower caster bearing configured to disposed in the bearing housing and about a lower portion of the caster spindle disposed in the bearing housing,
the component configured to rotate about the vertically oriented caster axis comprising a bearing spacer configured to be disposed between the upper caster bearing and the lower caster bearing and to be disposed about a mid-portion of the caster spindle disposed in the bearing housing, and the bearing spacer configured to rotate about the vertically oriented caster axis with the caster wheel assembly,
the stabilizer configured to be disposed in the bearing housing such that the first portion of the stabilizer is in contact with the bearing spacer, and the second portion of the stabilizer is in contact with an internal surface of the bearing housing to provide resistance to rotation of the caster wheel assembly relative to the bearing housing.

15. The system of claim 14,
wherein the upper caster bearing comprises a spindle bearing configured to facilitate rotation of the caster wheel assembly about the vertically oriented caster axis,
wherein the lower caster bearing comprises a spindle bearing configured to facilitate rotation of the caster wheel assembly about the vertically oriented caster axis.

16. The system of claim 15, further comprising a retainer coupled to an upper portion of the caster spindle and configured to retain the upper spindle bearing, the bearing spacer and the lower spindle bearing in position relative to the caster spindle and the bearing housing.

17. The system of claim 16, further comprising:
a cover coupled to an upper end of the bearing housing; and
a cylindrical spacer disposed about the caster spindle and between an upper portion of the caster fork and the lower spindle bearing.

18. The system of claim 10, wherein the bearing housing comprises a vertically oriented cylinder coupled to a front end of a frame of a zero-turn radius (ZTR) riding mower.

19. The system of claim 10, wherein the un-deformed internal diameter of the hollow cylindrical member is 90-110% of the external diameter of the component configured to rotate about the vertically oriented caster axis.

20. The system of claim 10, wherein the un-deformed internal diameter of the hollow cylindrical member is greater than the external diameter of the component configured to rotate about the vertically oriented caster axis.

21. A method of assembling a mower front caster wheel system, the method comprising:
disposing a stabilizer in a bearing housing coupled to a frame of a mower such that a first portion of the stabilizer is in contact with a component configured to rotate about a vertically oriented caster axis with a caster wheel assembly, and a second portion of the stabilizer is in contact with an internal surface of the bearing housing to provide resistance to rotation of the caster wheel assembly about the vertically oriented caster axis relative to the bearing housing, the caster wheel assembly comprising:
a front caster yoke comprising:
a caster fork configured to couple to a front wheel assembly comprising a wheel configured to rotate about a horizontally oriented axle axis; and
a caster spindle extending from the caster fork and configured to be disposed in the bearing housing coupled to a frame of a mower,
the stabilizer comprising a hollow cylindrical member having (a) an un-deformed external diameter that is greater than an internal diameter of the internal surface bearing housing and (b) an un-deformed internal diameter sized such that, when the stabilizer is deformed to fit within the bearing housing, the internal surface of the stabilizer has a resulting deformed internal diameter that is less than the external diameter of the component configured to rotate about the vertically oriented caster axis, and
the disposing of the stabilizer in the bearing housing comprising:
(a) deforming the stabilizer to fit within the bearing housing such that the internal surface of the stabilizer has a resulting deformed internal diameter that is less than the external diameter of the component configured to rotate about the vertically oriented caster axis; and
(b) further deforming the stabilizer fit within the bearing housing to fit around the bearing spacer such that:
(i) the external surface of the hollow cylindrical member is compressed against the internal surface of the bearing housing to provide frictional contact between the internal surface of the bearing housing and the external surface of the hollow cylindrical member, and
(ii) the internal surface of the hollow cylindrical member is compressed against the external surface of the component configured to rotate about the vertically oriented caster axis to provide frictional contact between the external surface of the component configured to rotate about the vertically oriented caster axis and the internal surface of the hollow cylindrical member.

22. The method of claim 21,
wherein the stabilizer comprises an elastomer, and
wherein the elastomer of the stabilizer is compressed to fit between the internal surface of the bearing housing and the component configured to rotate about the vertically oriented caster axis with the caster wheel assembly.

23. The method of claim 21, wherein the mower is a zero-turn radius (ZTR) riding mower.

24. The method of claim 21, wherein the component configured to rotate about the vertically oriented caster axis comprises a bearing spacer configured to be disposed between an upper caster bearing and a lower caster bearing and to be disposed about a mid-portion of the caster spindle disposed in the bearing housing, and wherein the bearing spacer is configured to rotate about the vertically oriented caster axis with the caster wheel assembly.

25. The method of claim 21, wherein the un-deformed internal diameter of the hollow cylindrical member is 90-110% of the external diameter of the component configured to rotate about the vertically oriented caster axis.

26. The method of claim 21, wherein the un-deformed internal diameter of the hollow cylindrical member is greater than the external diameter of the component configured to rotate about the vertically oriented caster axis.

* * * * *